US007532744B2

United States Patent
Sharoni et al.

(10) Patent No.: US 7,532,744 B2
(45) Date of Patent: May 12, 2009

(54) VIDEO AND AUDIO CONTENT ANALYSIS SYSTEM

(75) Inventors: David Sharoni, Rosh Ha'Ayin (IL); Hagai Katz, Tel Aviv (IL); Yehuda Katzman, Tel Aviv (IL); Doron Girmonski, Ra'anana (IL)

(73) Assignee: Nice Systems Ltd., Raanana (IL)

( * ) Notice: Subject to any disclaimer, the term of this patent is extended or adjusted under 35 U.S.C. 154(b) by 0 days.

(21) Appl. No.: 12/025,291

(22) Filed: Feb. 4, 2008

(65) Prior Publication Data

US 2008/0144887 A1 Jun. 19, 2008

Related U.S. Application Data

(63) Continuation of application No. 10/056,049, filed on Jan. 28, 2002, now Pat. No. 7,346,186.

(60) Provisional application No. 60/264,725, filed on Jan. 30, 2001.

(51) Int. Cl.
*G06K 9/00* (2006.01)
*H04N 7/18* (2006.01)

(52) U.S. Cl. ........................ 382/103; 382/291; 348/143

(58) Field of Classification Search ................. 382/103, 382/106, 107, 115, 118, 123, 151, 156, 169, 382/174, 181–184, 192, 199, 203, 206, 232, 382/233, 254, 274, 285, 291, 295, 305; 340/572.4, 340/506, 572.3; 348/143, 14.12, 14.2; 370/352, 370/384; 379/45
See application file for complete search history.

(56) References Cited

U.S. PATENT DOCUMENTS

| | | | | |
|---|---|---|---|---|
| 5,751,707 | A * | 5/1998 | Voit et al. | 370/384 |
| 5,987,154 | A * | 11/1999 | Gibbon et al. | 382/115 |
| 6,246,320 | B1 * | 6/2001 | Monroe | 340/506 |
| 6,275,855 | B1 * | 8/2001 | Johnson | 709/224 |
| 6,330,025 | B1 * | 12/2001 | Arazi et al. | 348/143 |
| 6,697,103 | B1 * | 2/2004 | Fernandez et al. | 348/143 |
| 6,826,173 | B1 * | 11/2004 | Kung et al. | 370/352 |
| 6,856,343 | B2 * | 2/2005 | Arazi et al. | 348/143 |

* cited by examiner

*Primary Examiner*—Seyed Azarian
(74) *Attorney, Agent, or Firm*—Pearl Cohen Zedek Latzer, LLP

(57) ABSTRACT

The present invention is directed to various methods and systems for analysis and processing of video and audio signals from a plurality of sources in real-time or off-line. According to some embodiments of the present invention, analysis and processing applications are dynamically installed in the processing units.

12 Claims, 4 Drawing Sheets

VIDEO AND AUDIO CONTENT ANALYSIS SYSTEM

CROSS-REFERENCE TO RELATED APPLICATIONS

This application is a Continuation application of U.S. patent application Ser. No. 10/056,049, filed on Jan. 28, 2002 now U.S. Pat. No. 7,346,186, which claims priority of U.S. Provisional Application No. 60/264,725, filed on Jan. 30, 2001 both of which being incorporated by reference herein in their entirety.

BACKGROUND OF THE INVENTION

The ever-increasing use of video and audio in the military, law enforcement and surveillance fields has resulted in the need for an integrative system that may combine several known detecting and monitoring systems. There are several questions related to real-time and off-line analysis and processing of information regarding the existence and behavior of people and objects in a certain monitored area.

Examples of such typical questions include questions regarding presence and identification of people (e.g. Is there anybody? If so, who is he?), movement (e.g. Is there anything moving?), number of people (e.g. How many people are there?), duration of time (e.g. for how long have they stayed in the area?), identifications of sounds, content of speech, number of articles and the like.

Currently, a dedicated system having a separate infrastructure is usually installed to provide a limited solution to each of the above-mentioned questions. Non-limiting examples of these systems include a video and audio recording system such as NiceVision of Nice Systems Ltd., Ra'anana, Israel, a movement-detecting system such as Vicon8i of Vicon Motion Systems, Lake Forest, Calif., USA and a face-recognition system such as FaceIt system of Visionics Corp., Jersey City, N.J., USA.

The separate infrastructure for each application also limits the area of surveillance. For example, a face recognition system, which is connected to a single dedicated video sensor, can cover only a narrow area. Moreover, the separated applications provide only a limited and partial integration between various monitoring applications.

An integrated monitoring system may enable advanced solutions for combined and conditioned questions. An example of conditioned questions is described below. "If there is a movement, is anyone present? If someone is present, can he be identified? If he can be identified, what is he saying? If he cannot be identified, record the event."

It would be advantageous to have an integrated monitoring system for analysis and processing of video and audio signal from a plurality of sources in real-time and off-line.

SUMMARY OF THE INVENTION

The present invention is directed to various methods and systems for analysis and processing of video and audio signals from a plurality of sources in real-time or off-line. According to some embodiments of the present invention, analysis and processing applications are dynamically installed in the processing units.

There is thus provided in accordance with some embodiments of the present invention, a system having one or more processing units, each coupled to a video or an audio sensor to receive video or audio data from the sensor, an application bank comprising content-analysis applications, and a control unit to instruct the application bank to install at least one of the applications into at least one of the processing units.

There is further provided in accordance with some embodiments of the present invention, a method comprising installing one or more content-analysis applications from an application bank into one or more video or audio processing units, the applications selected according to predetermined criteria and processing input received from one or more video or audio sensors, each coupled to a respective one of the video or audio processing units according to at least one of the installed applications.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings in which:

Figure 1:
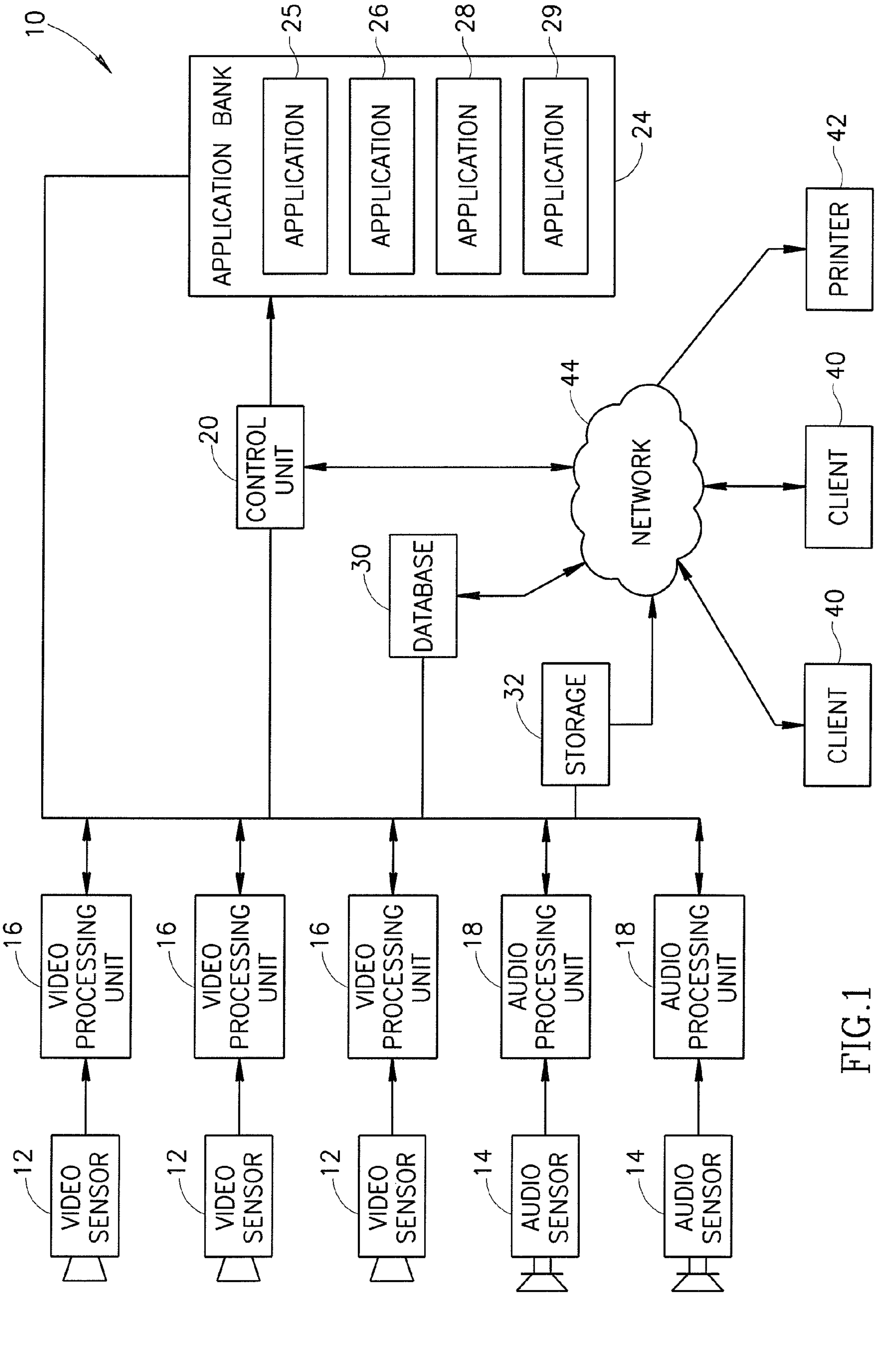
FIG. 1 is a block diagram illustration of a video and audio content analysis system according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Reference is now made to FIG. 1, which is a block diagram illustration of a video and audio content analysis system 10 according to some embodiments of the present invention. System 10 may be coupled to a surveillance system having a video and audio logging and retrieval unit such as NiceVision of Nice Systems Ltd., Ra'anana, Israel.

System 10 may comprise a plurality of video sensors 12 and a plurality of audio sensors 14. Video sensor 12 may output an analog video signal or a digital video signal. The digital signals may be in the form of data packages over Internet Protocol (IP) as their upper layer and may be transmitted over digital subscriber line (DSL), asymmetric DSL (ADSL), asynchronous transfer mode (ATM) and frame relay (FR).

Audio sensor 14 may output an analog audio signal or a digital audio signal. The digital signals may be in the form of data packages over a network, for example, an IP network, an ATM network or a FR network.

System 10 may further comprise a plurality of video-processing units 16 able to receive signals from video sensors 12 and a plurality of audio-processing units 18 able to receive signals from audio sensors 14. Video-processing units 16 may be coupled to video sensors 12 and may be located in the proximity of sensors 12 or may be located remote from sensors 12. Alternatively, video-processing units 16 may be embedded in video sensors 12. Audio-processing units 18 may be coupled to audio sensors 14 and may be located in the proximity of sensors 14 or may be located remote from sensors 14. Alternatively, audio-processing units 18 may be embedded in audio sensors 14. Video-processing unit 16 and audio-processing unit 18 may be a single integral unit.

Other types of sensors and their associated processing units may be added to system 10. Non-limiting examples of additional sensors are smoke sensors, fire sensors, motion detectors, sound detectors, presence sensors, movement sensors, volume sensors, and glass breakage sensors.

System 10 may further comprise an application bank 24 coupled to processing units 16 and 18. Application bank 24 may comprise a plurality of various content analysis applications based on video and/or audio signals processing. For example, application 25 may be a video motion-detecting application, application 26 may be a video based people-counting application, application 28 may be a face-recognition application, and application 29 may be a voice-recognition application. Additional applications may be added to application bank 24. Non-limiting examples of additional applications include conversion of speech to text, compressing the video and/or audio signal and the like.

System 10 may further comprise a database 30 and a storage media 32. Storage media 32 may receive data from processing units 16 and 18 and to store video and audio input. Non-limiting examples of storage media 32 include a computer's memory, a hard disk, a digital audio-tape, a digital video disk (DVD), an advanced intelligent tape (AIT), digital linear tape (DLT), linear tape-open (LTO), JBOD, RAID, NAS, SAN and ISCSI. Database 30 may store time, date, and other annotations relating to specific segments of recorded audio and video input. For example, an input channel associated with the sensor from which the input was received and the location of the stored input in storage 32. The type of trigger for recording, manual or scheduled, may likewise be stored in database 30. Alternatively, the segments of recorded audio and video, preferably compressed may be also stored in database 30.

System 10 may further comprise a control unit 20 able to control any of elements 16, 18 and 24. At least one set of internal rules may be installed in control unit 20. Non-limiting examples of a set of rules include a set of installation rules, a set of recording rules, a set of alert rules, a set of post-alert action rules, and a set of authorization rules.

The set of installation rules may determine the criteria for installing applications in the processing units. The set of recording rules may determine the criteria for recording audio and video data. The set of alert rules may determine the criteria for sending alert notifications from the processing units to the control unit. The set of post-alert action rules may determine the criteria for activating or deactivating applications installed in a processing unit and the criteria for re-installing applications in the processing units.

Control unit 20 may command application bank 24 to install various applications in processing units 16 and 18 as required by the internal rules installed in control unit 20. The installation may vary among various processing units. For example, in one video-processing unit 16, application bank 24 may install motion detection application 25 and people-counting application 26. In another video-processing unit 16, application bank 24 may install motion detection application 25 and face recognition application 28.

The installation may be altered from time to time according to instructions from a time-based scheduler (not shown) installed in control unit 20 or manually triggered by an operator as will be explained below.

System 10 may further comprise at least one client computer 40 having a display and at least one speaker (not shown) and at least one printer 42. Client computer 40 and printer 42 may be coupled to database 30, storage 32, control unit 20, and application bank 24, either by direct connection or via a network 44. Network 44 may be a local area network (LAN) or a wide area network (WAN).

The operators of system 10 may control it via client computers 40. Client computer 40 may request playing a real-time stream of video and/or audio data. Alternatively, client 40 may request playback of video and audio data stored at database 30 and/or storage 32. The playback may comprise synchronized or unsynchronized recorded data of multiple audio and/or video channels. The video may be played on the client's display and the audio may be played via the client's speakers.

Client 40 may also edit the received data and may execute off-line investigation. The term "off-line investigation" refers to the following mode of operation. Client 40 may request playback of certain video and/or audio data stored in storage 30. Client 40 may also command application bank 24 to download at least one of the applications to client 40. After receiving the application and the video and/or audio files, the application may be executed by client 40 off-line. The off-line investigation may be executed even when the specific application was not installed or enabled on the processing unit 16 or 18 coupled to the sensor 12 or 14 from which the video or audio data were recorded.

Each operator may have personal authorization to perform certain operations according to a predefined set of authorization rules installed in control unit 20. Some operators may have authorization to alter via client 40 at least certain of the internal rules installed in control unit 20. Such alteration may include immediate activation or de-activation of an application in one of processing units 18 and 16.

Client 40 may also send queries to database 30. An example of a query may be: "Which video sensors detected movement between 8:00 AM and 11:00 AM?" Client 40 may also request sending reports to printer 42.

Figure 2:
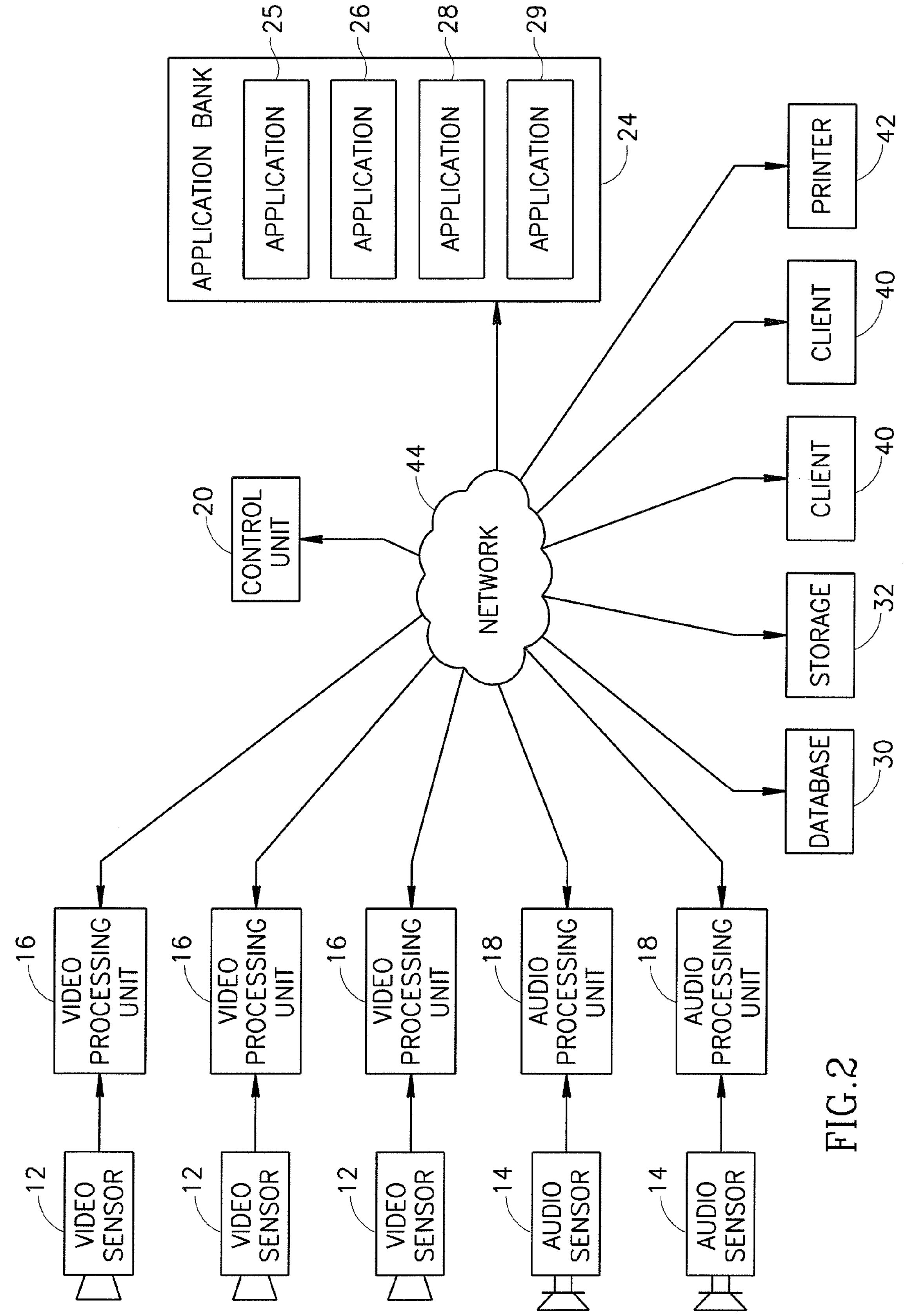
FIG. 2 is a block diagram illustration of a distributed video and audio content analysis system according to some embodiments of the present invention.

Reference is now made to FIG. 2, which is a block diagram illustration of a video and audio content analysis system 11 according to some embodiments of the present invention. System 11 is a distributed version of system 10 of FIG. 1 and elements in common may have the same numeral references. In these embodiments, video sensors 12, which may be coupled to video processing units 16 and audio sensors 14, which may be coupled to audio processing units 18 may be located at least two remote and separate sites.

Processing units 16 and 18 may be coupled to all the other elements (e.g. database 30, storage 32, control unit 20 and application bank 24 as well as clients 40) of system 11 via network 44. Application bank 24, control unit 20, database 30 and storage 32 may be coupled to each other via network 44, which may include several networks. However, it should be understood that the scope of the present invention is not limited to such a system and system 10 may be only partially distributed.

Figure 3:
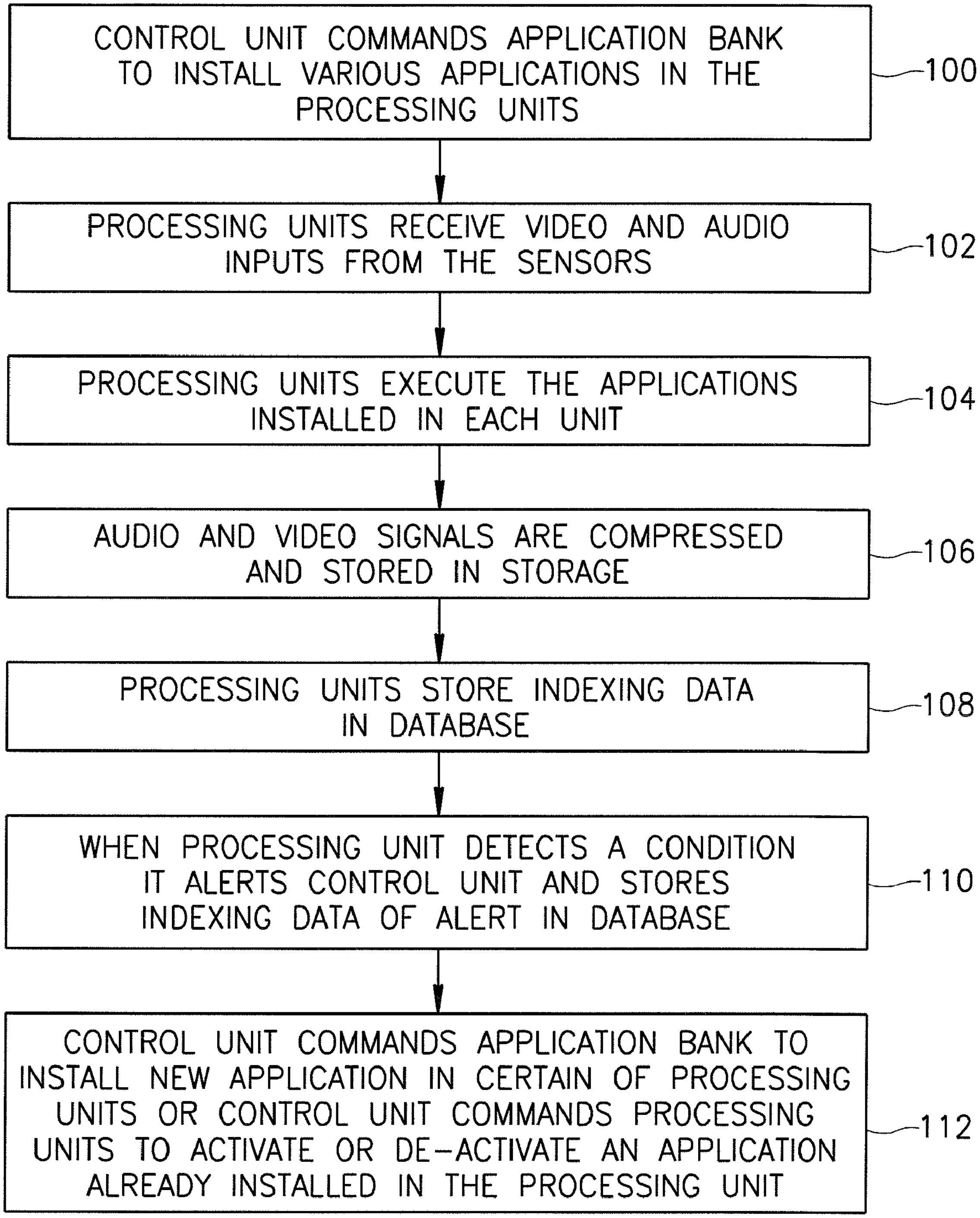
FIG. 3 is a flow chart diagram of the operation of the system of FIGS. 1 and 2 according to some embodiments of the present invention.

Reference is now made to FIG. 3, which is a simplified flowchart illustration of the operation of the video and audio content analysis system of FIGS. 1 and 2, according to some embodiments of the present invention. In the method of FIG. 3, control unit 20 may command application bank 24 to install various applications in processing units 16 and 18 (step 100). Different applications may be installed in different units. Processing units 16 and 18 may then receive video and audio signals from video and audio sensors 12 and 14, respectively (step 102). If the signals are analog signals, processing units 16 and 18 may convert the analog signals to digital signals.

Processing units 16 and 18, then, may execute the applications installed in each unit (step 104). The audio and video signals may be compressed and stored in storage media 32 according to a predefined set of recording rules installed in control unit 20 (step 106).

Processing units 16 and 18 may also output indexing-data to be stored in database 30 (step 108). Non-limiting examples of indexing data may include the time of recording, time occurrence of matching a voice or face and the time of counting. Other non-limiting examples may include a video channel number, an audio channel number, results of a people-counting application (e.g. number of people), an identifier of the recognized voice or the recognized face and direction of movement detected by a motion detection application.

Processing unit 16 or 18 may alert control unit 20 when one of the applications installed in it detects a condition corresponding to one of the predefined alert rules (step 110). An example of an alert-rule may be the detection of more than a predefined number of people in a zone covered by one of video sensors 12. Another example of an alert-rule may be the detection of a movement of an object larger than a predefined size from the right side to the left side of a zone covered by one of the sensors. Yet another example may be the detection of a particular face or a particular voice.

Each alert, sent by one of processing units 16 or 18 to control unit 10, may also be stored in database 30. The data stored may contain details about the alert such as the time of occurrence, the identifier of the sensor coupled to the processing unit providing the alert and the like.

Upon receiving an alert, control unit 20 may send a message to at least one of clients 40 notifying about the alert. Additionally or alternatively, control unit 20 may command application bank 24 to alter the applications installed in some of the processing units 16 and/or 18. Alternatively, control unit may directly command processing units 16 and/or 18 to activate or deactivate any application installed in the units (step 112). The new commands may be set according to predefined post-alert action-rules installed in control unit 20.

A non-limiting example of a post-alert action-rule may be: If one of video sensors 12 detects a movement, install face recognition application 28 in the processing unit 16, which is coupled to that sensor. Another example of a post-alert action-rule may be: If a particular person is identified by one of processing units 16, activate the compression application and record the video signal of the sensor 12 coupled to that processing unit. A third example may be: If one of audio sensors 14 identifies the voice of a particular person, install face recognition application to a specific processing unit 16 coupled to video sensor 12 and start compression and recording of the video signal of that sensor.

The internal rules of control unit 20 may include the alteration of at least certain of the internal rules according to a time-based scheduler (not shown) stored in control unit 20.

Figure 4A:
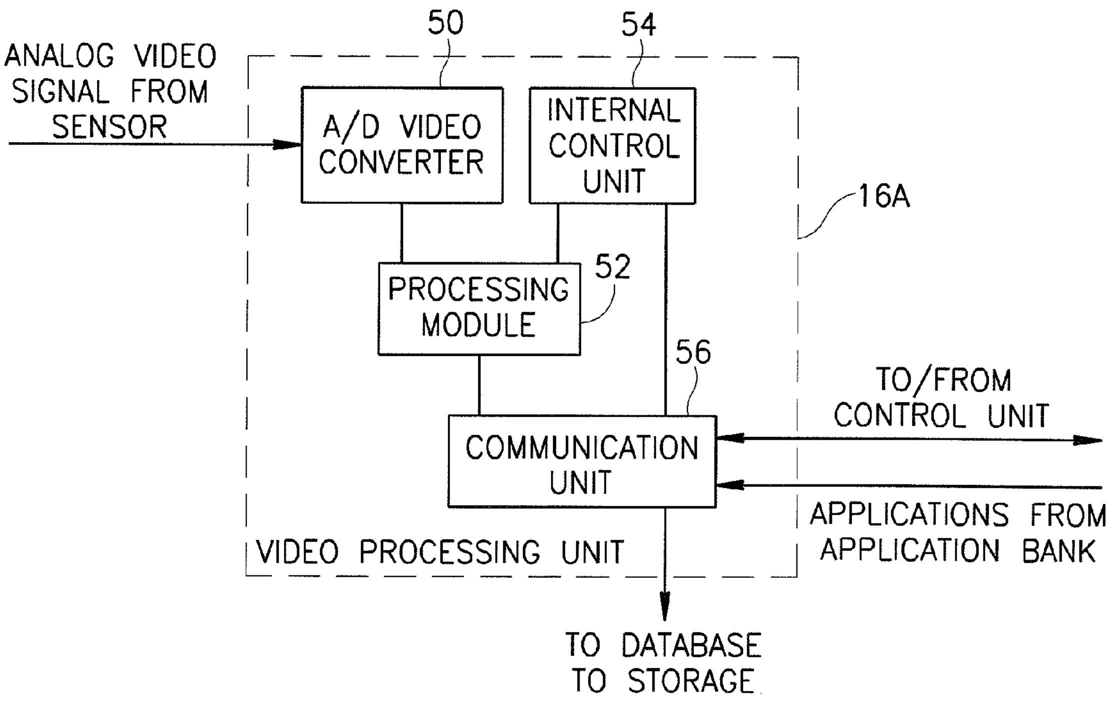
FIGS. 4A and 4B are block diagram illustrations of the video-processing unit of FIG. 1 and FIG. 2 according to some embodiments of the present invention.
Figure 4B:
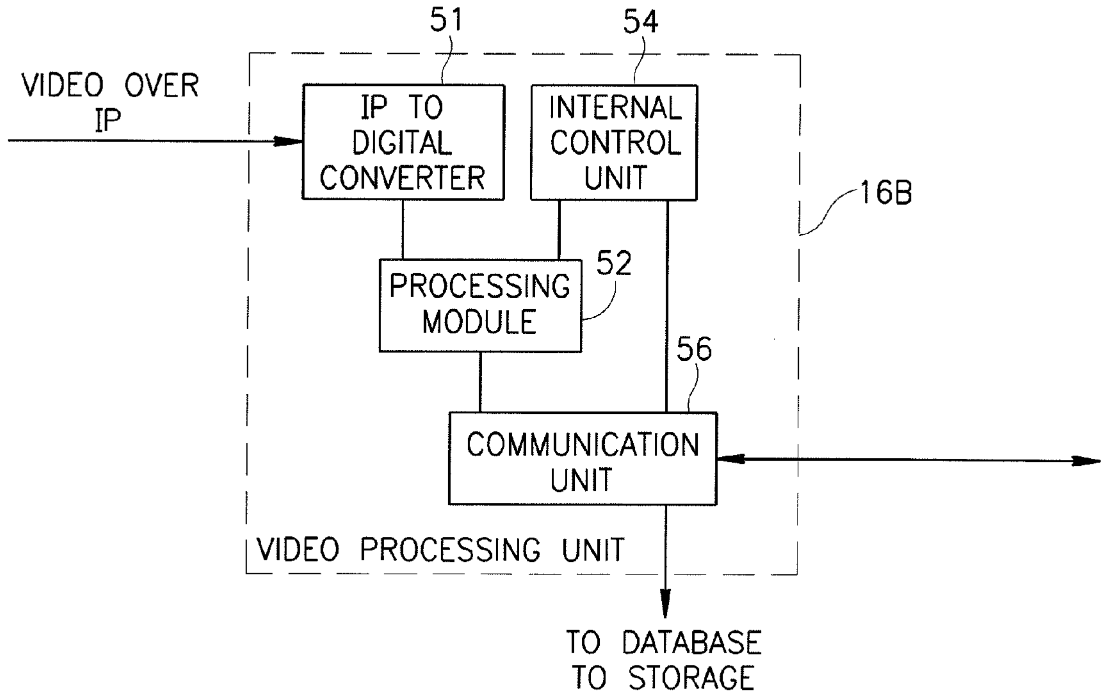

Reference is now made to FIGS. 4A and 4B, which are block diagrams of video-processing unit 16 of FIG. 1 according to some embodiments of the present invention. For clarity, FIGS. 4A and 4B and the description given hereinbelow refer only to video-processing units. However, it will be appreciated by persons skilled in the art that audio-processing units 18 may have similar structure.

Video-processing unit 16A may comprise an analog to digital (A/D) video signal converter 50 as illustrated in FIG. 4A. A/D video converter 50 may receive analog video signals from one of video sensors 12 and to convert the analog signals into digital video signals.

Alternatively, video-processing unit 16B may comprise an Internet protocol (IP) to digital video signal converter 51 as illustrated in FIG. 4B. Converter 51 may receive video signal over IP protocol from one of video sensors 12 and to extract video signals from the IP protocol.

Video-processing unit 16 may further comprise a processing module 52, an internal control unit 54, and a communication unit 56. Internal control unit 54 may receive applications from application bank 24 and may install the applications in processing module 52. Internal control unit 54 may further receive commands from control unit 20 and to alert control unit 20 when a condition corresponding to a rule is detected.

Processing module 52 may be a digital processor able to execute the applications installed by application bank 24. More than one application may be installed in video-processing unit 16. Processing unit 16 may further compress the audio and video signal and to transfer the compressed data to storage media 32 via communication unit 56. Processing module 52 may further transfer indexing data and the results of the applications to database 30 via communication unit 56. Non-limiting examples of communication unit 56 include a software interface, CTI interface, and an IP modem.

The following examples are now given, though by way of illustration only, to show certain aspects of some embodiments of the present invention without limiting its scope.

EXAMPLE I

An operator commands control unit 20 via client 40:

Install in all video-processing units a video compression application.

Install at 08:00, in video-processing units coupled to video sensors #V1-#V2 a face-recognition application and at 18:00 a motion detection application.

Install in video-processing units coupled to video sensors #V11-#V16 a people-counting application.

Install in video-processing units coupled to video sensors #V17-#V20 a motion detection application.

Record for one minute the compressed video data received from any processing unit if a motion is detected or if the face-recognition application fails to identify a face.

If more than 20 people are detected by video sensors #V11-#V16, compress the video data until the number of people is less than 20.

If a movement is detected by more than 30 video sensors within an hour, install people-counting application in video-processing units coupled to video sensors #V21-#V30.

EXAMPLE II

Mr. X has to be located immediately.

An authorized operator commands control unit 20 via client 40 to add at least one rule regarding Mr. X.

Install in all video-processing units a face-recognition application.

Install in all audio-processing units a voice-recognition application.

Notify control unit when Mr. X is located.

EXAMPLE III

Off Line Investigation

Calculating the number of people in the lobby at 08:00-08:30 and at 17:00-17:30, Monday to Friday.

An operator downloads a people-counting application to client 40.

The operator requests playback of recorded video data from the video sensor installed in the lobby according to the required times.

Client 40 executes the application and send a report to its display and/or printer 42.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system comprising:

an application bank of content-analysis applications;

two or more video processing units, each having respective one or more of the content-analysis applications installed therein, each of the video processing units coupled to a respective video sensor and receiving video data from the video sensor over Internet Protocol (IP); and a control unit separate from said video processing units, said control unit having installed therein a set of rules, the control unit coupled to the video processing units and to the application bank, wherein upon receiving a notification from one of the video processing units that one of the applications installed therein detects a first predefined condition based on content-analysis processing of at least a portion of the video data, the control unit automatically and dynamically instructs the application bank to install in real-time, at least another one of the content-analysis applications into at least one of the processing units based on the set of rules;

wherein the application bank includes at least two of a video movement-detecting application, a video based people counting application, a face detection and recognition application, a voice detection and recognition application, an object detection application or a recognition and surveillance application, and wherein upon receiving said notification, the control unit automatically and dynamically instructs the application bank to install in real-time, at least two of said video movement-detecting application, said video based people counting application, said face detection and recognition application, said voice detection and recognition application, said object detection application, and said recognition and surveillance applications into at least one of the processing units based on the set of rules.

2. The system of claim 1 comprising:

an audio processing unit coupled to an audio sensor having one or more of the content-analysis applications installed therein, the audio processing unit coupled to a respective audio sensor and receives audio data from the audio sensor over Internet Protocol (IP).

3. The system of claim 2, wherein upon receiving a notification from the audio processing unit that one of the applications installed therein detects a predefined condition based on content-analysis processing of at least a portion of the audio data, the control unit automatically and dynamically instructs the application bank to install in real-time, at least another one of the content-analysis applications into at least one of the processing units based on the set of rules.

4. The system of claim 2, wherein one of the rules is to install a face recognition application upon identification of the voice of a particular person.

5. The system of claim 1 further comprising:

at least one additional processing unit coupled to a sensor, the sensor being a smoke sensor, a fire sensor, a motion detector, a sound detector, a presence sensor, a movement sensor, a volume sensor or a glass breakage sensor.

6. The system of claim 1, wherein the application bank further comprises at least a conversion of speech to text application or a video compression application, and wherein upon receiving said notification, the control unit automatically and dynamically instructs the application bank to install in real-time, at least one of said conversion of speech to text application or said video compression application into at least one of the processing units based on the set of rules.

7. The system of claim 1 further comprising a database to store indexing data associated with the video data.

8. The system of claim 1, wherein the application bank, the control unit and the processing units are all coupled via a local area or a wide area network.

9. The system of claim 1, wherein the video processing units are embedded in the video sensors.

10. The system of claim 1, wherein upon receiving another notification from one of the video processing units that one of the applications installed therein detects a second predefined condition based on content-analysis processing of at least a portion of the video data, the control unit automatically instructs one of the processing units to activate or deactivate one of the content-analysis applications already installed therein.

11. The system of claim 1, wherein one of the rules is to install a face recognition application upon detection of a movement.

12. The system of claim 1, wherein one of the rules is to install a video compression application upon identification of a particular person.

* * * * *